Sept. 25, 1956 R. H. ANDERSON ET AL 2,764,374

JETTISONABLE FUEL TANKS

Filed Feb. 10, 1953 11 Sheets-Sheet 1

INVENTORS.
ROY H. ANDERSON
WILLIAM H. COOK, JR.
DAVID L. DUNN
BY
Reynolds, Beach, & Christensen
ATTORNEYS Sept. 25, 1956 R. H. ANDERSON ET AL 2,764,374

JETTISONABLE FUEL TANKS

Filed Feb. 10, 1953 11 Sheets-Sheet 2

INVENTORS.
ROY H. ANDERSON
WILLIAM H. COOK, JR.
DAVID L. DUNN
BY
Reynolds, Beach & Christensen
ATTORNEYS

INVENTORS.
ROY H. ANDERSON
WILLIAM H. COOK, JR.
DAVID L. DUNN

BY
Reynolds, Beach & Christensen
ATTORNEYS

INVENTORS.
ROY H. ANDERSON
WILLIAM H. COOK, JR.
DAVID L. DUNN
BY
Reynolds, Beach & Christensen
ATTORNEYS

JETTISONABLE FUEL TANKS

Filed Feb. 10, 1953 11 Sheets-Sheet 5

INVENTORS.
ROY H. ANDERSON
WILLIAM H. COOK, JR.
DAVID L. DUNN
BY Reynolds, Beach, & Christensen
ATTORNEYS Sept. 25, 1956 R. H. ANDERSON ET AL 2,764,374

JETTISONABLE FUEL TANKS

Filed Feb. 10, 1953 11 Sheets-Sheet 6

INVENTORS.
ROY H. ANDERSON
WILLIAM H. COOK, JR.
DAVID L. DUNN
BY
Reynolds, Beach + Christensen
ATTORNEYS INVENTORS.
ROY H. ANDERSON
WILLIAM H. COOK, JR.
DAVID L. DUNN
BY
Reynolds, Beach & Christensen
ATTORNEYS INVENTORS.
ROY H. ANDERSON
WILLIAM H. COOK, JR.
DAVID L. DUNN
BY
Reynolds, Beach & Christensen
ATTORNEYS Sept. 25, 1956 R. H. ANDERSON ET AL 2,764,374

JETTISONABLE FUEL TANKS

Filed Feb. 10, 1953 11 Sheets-Sheet 9

INVENTORS.
ROY H. ANDERSON
WILLIAM H. COOK, JR.
DAVID L. DUNN
BY
Reynolds, Beach & Christensen
ATTORNEYS

JETTISONABLE FUEL TANKS

Filed Feb. 10, 1953 11 Sheets-Sheet 10

INVENTORS.
ROY H. ANDERSON
WILLIAM H. COOK, JR.
DAVID L. DUNN

BY Reynolds, Beach & Christensen
ATTORNEYS

JETTISONABLE FUEL TANKS

Filed Feb. 10, 1953 11 Sheets-Sheet 11

INVENTORS.
ROY H. ANDERSON
WILLIAM H. COOK, JR.
DAVID L. DUNN
BY
Reynolds, Beach & Christensen
ATTORNEYS 2,764,374

JETTISONABLE FUEL TANKS

Roy H. Anderson, Bellevue, William H. Cook, Jr., Mercer Island, and David L. Dunn, Seattle, Wash., assignors to Boeing Airplane Company, Seattle, Wash., a corporation of Delaware Application February 10, 1953, Serial No. 336,038
13 Claims. (Cl. 244—135)

Figures 1, 2:
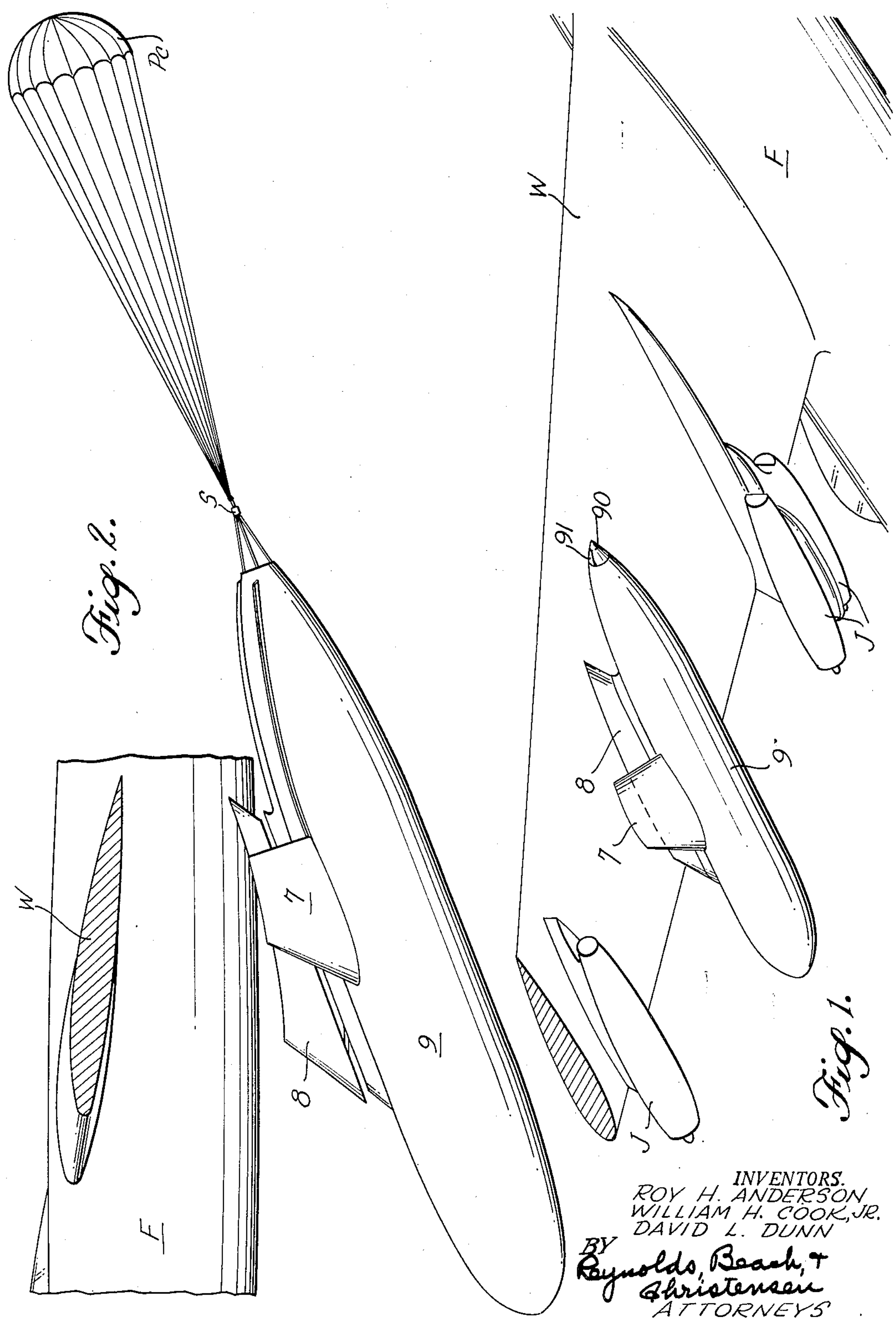

The range of aircraft in general, and of jet-powered aircraft in particular, can be greatly lengthened by attaching supplemental fuel tanks beneath the wings. Such tanks add somewhat to the drag and to the rate of fuel consumption, hence should be dropped when empty in order to lighten the load, to lessen the drag, and to extend the range of the aircraft.

In dropping such tanks heretofore it has been found that the empty tank, if suddenly detached from the wing while flying at high speed, is likely to be thrown by the airflow in an erratic manner, such that it may strike and damage engines located spanwise from it, or upwardly to damage the wing or control surfaces, or it may strike and disable the tail surfaces. In order to avoid these dangers inherent in uncontrolled release, it has been proposed to supply fins to them, as to bombs, which increases their drag unduly, or to release such tanks in a manner to initate their spinning about a longitudinal axis, to the end that their fail is controlled in some degree.

Such expedients may be useful under some conditions, as when the tanks are relatively small, and are suspended at the wing tips, well outboard from the empennage, but when the tanks are large enough to carry a supplementary fuel volume suitable for large long-range jet-powered aircraft, and are correspondingly bulky and heavy—empty as well as filled—they must be carried well inboard if the basic aircraft design is not to be strengthened and made heavier, and in such a location and with such bulky tanks, the more susceptible to wind action by reason of their large bulk, there is much more danger of damage from a released tank falling uncontrolled, and much greater probability that the wind will toss about such a bulky tank in a dangerous manner.

Moreover, release means used heretofore have been or have been patterned after bomb release shackles, and have not been found suitable for effecting positive and controlled release of large empty fuel tanks, wherein the ratio of surface area to weight is high, and wherein the tank itself has nothing to insure its detachment from the wing attachment elements, as gravity and the fins of a bomb do for the relatively heavier bombs.

It has been found necessary to effect disengagement of the tank from its wing attachment elements under the influence of a positive, dependable force which will produce no drag during normal flight. Likewise it has been found necessary to separate the tank and its strut or struts from the wing under the influence of such a positive force, acting only at the time of release, and in such manner and in such direction that the movement and position of the tank are wholly under control, and it is kept from the possibility of contact with any part of the aircraft, notwithstanding the force of the airstream, until the aircraft has passed beyond the location of the tank so far that contact is impossible.

It is also necessary to carry out automatically certain safety provisions, such as disconnection and sealing of liquid and electrical connections between the aircraft and the tank, in advance of completion of the tanks' disconnection.

It is the general object of the present invention to provide a jettisonable fuel tank, one especially designed for use with large, long range aircraft, and wing attachment and release means for such a tank, which will have the characteristics indicated above.

Primarily, it is an object to effect the release of the tank, including its strut or struts, and including further any fuel lines and electrical connections, under the influence of a positive and sufficient drag force, such as a parachute canopy released from within the tank itself and trailing aft, and to utilize a like, or that same, positive force, after the release is completed, to pull the tank positively and in a controlled manner away from the wing, the force and its control over the released tank being adequate to prevent any uncontrolled or dangerous movement of the tank until such time as the aircraft is out of range of the tank.

Likewise, it is an object to provide such a jettisonable or droppable fuel tank for airplanes, and release mechanism for the same, so arranged that the release is accomplished in a series of sequential and mutually interdependent operations, whereby after release is initiated by the pilot, there will occur automatically and in sequence release of the tank from its main supporting strut and simultaneously release of any lateral sway brace or side strut, the release of these will entrain disengagement automatically of the fuel lines and electrical connections, and their release will be followed by release of the main strut from the wing, and the pulling away of the entire tank with its struts in a positive fashion, and in a controlled manner, to the ends already indicated.

The present invention, then, concerns the improved jettisonable fuel tank, its connection to the aircraft, and the mechanism whereby it is released and pulled away from the aircraft and controlled immediately following its release, in the manner and to the ends indicated above.

In the accompanying drawings the invention is shown embodied in a typical construction and as applied to a typical large six-jet airplane, it being understood that the drawings illustrate no particular aircraft, and only a presently preferred form of the invention, and that various changes may be made in the details thereof without departing from the principles of the invention as hereinafter and as heretofore disclosed.

Figure 1 is a rear, underside isometric view of the drop tank and its main strut and side strut, all secured in place in flight condition beneath the wing of an airplane, and Figure 2 is a side elevational view showing the same elements, but attempting to show positional relationships of the drop tank and of the airplane which in fact would occur at such widely separated points laterally, and to some degree vertically, as to be incapable of precise repsentation within the confines of a drawing sheet. In other words, Figure 2 is a side elevational view representing unrealistically and yet illustratively the relationship of the tank and the airplane after completion of release and pulling away of the tank.

Figure 4:
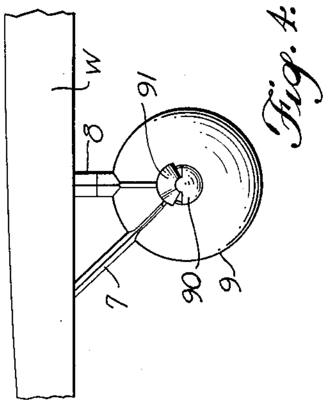
Figure 3:
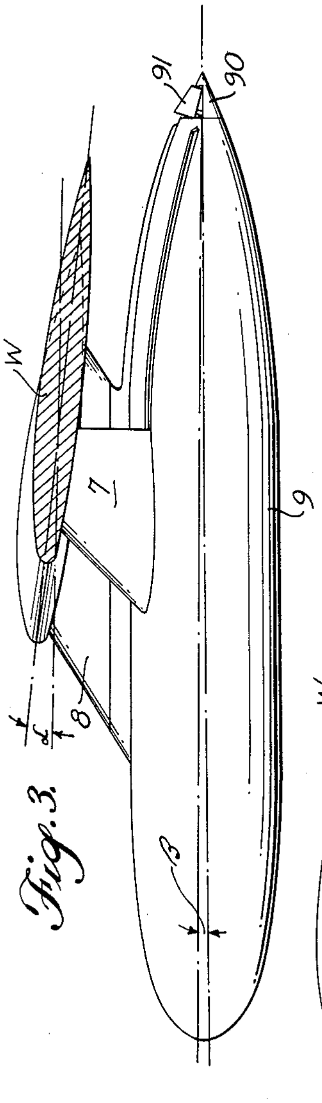
Figure 5:
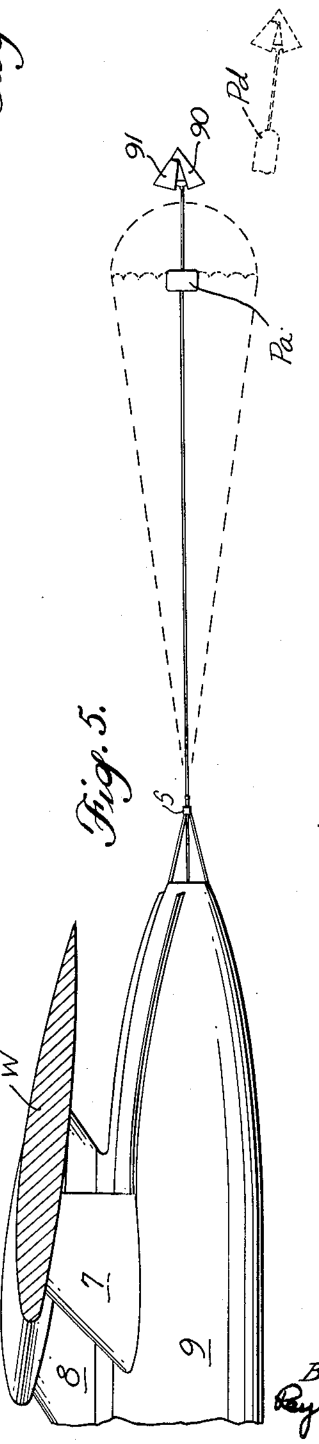
Figure 6:
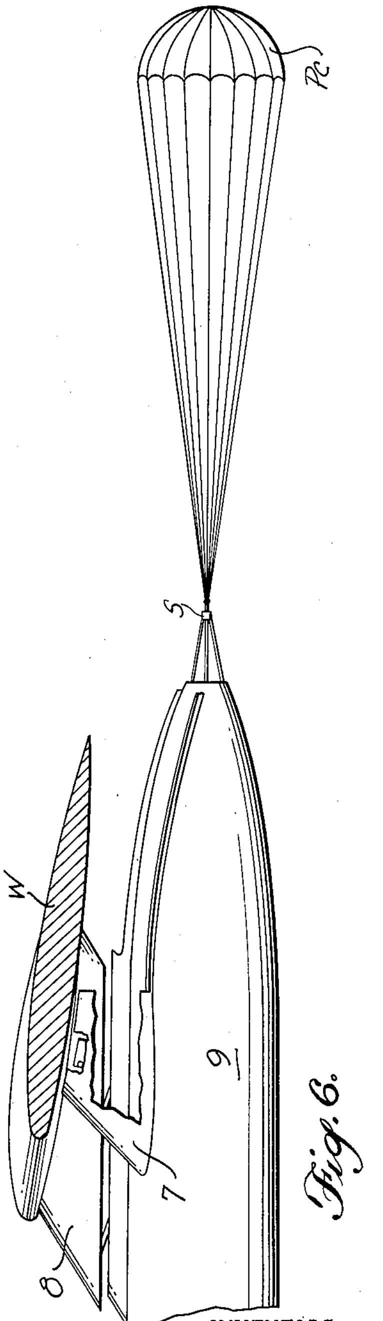

Figures 3 to 6 inclusive illustrate successive stages of release intermediate Figures 1 and 2; Figures 3 and 4 being respectively a side elevational view and a rear elevational view of the drop tank and wing at the initiation of release with the pilot chute open but not detached; Figure 5 being a side elevational view with the pilot chute released and detached but the pullaway parachute canopy not yet open; and Figure 6 being a view similar to Figure 5, but with the pullaway parachute canopy fully open and the drop tank disengaged from the main strut, and the side strut disengaged from the wing, but the main strut not yet released from the wing.

Figure 7:
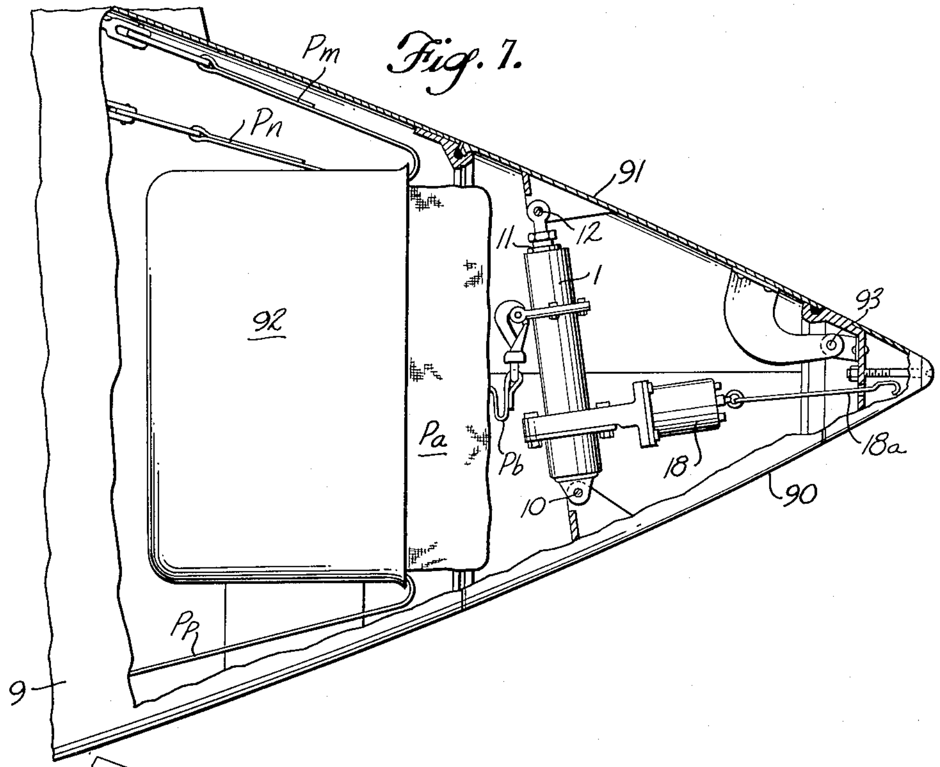
Figure 8:
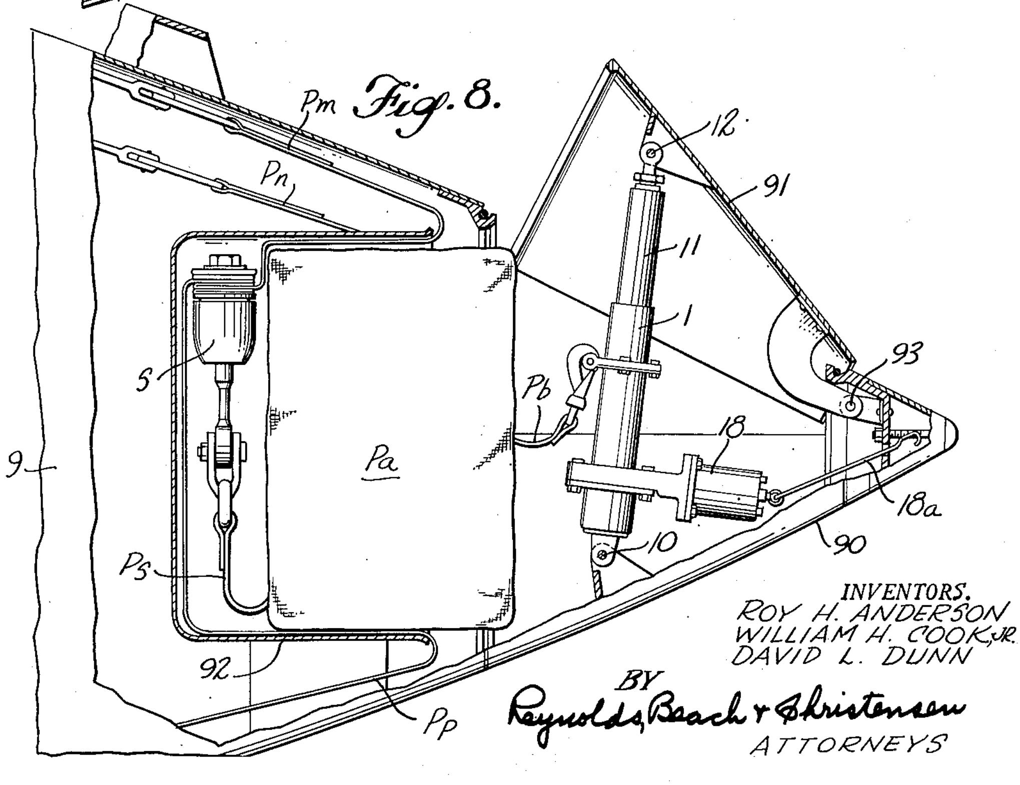

Figures 7 to 12 inclusive illustrate details of the pilot chute, its latching and opening mechanisms, and its relationship to the main parachute pack assembly and to the drop tank as a whole. Figure 7 is an axial sectional detail with the pilot chute closed and latched in place as the extreme rear element of the tank, and Figure 8 is a similar view showing the pilot chute at the instant of its opening, and illustrating further the connections from the parachute pack assembly to the tank and strut release mechanisms, and to the tank itself.

Figure 11:
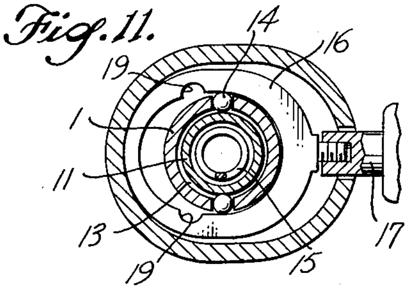
Figure 10:
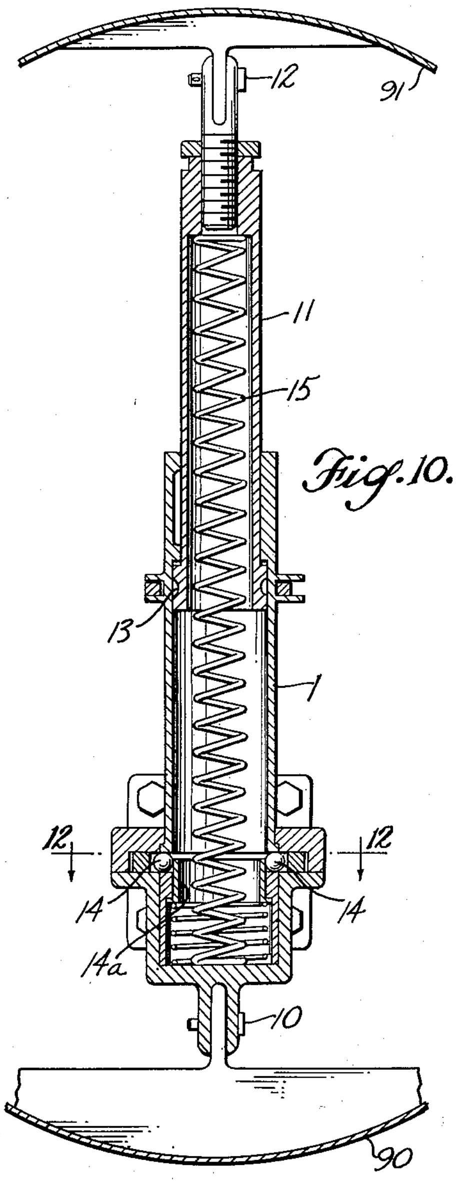
Figure 9:
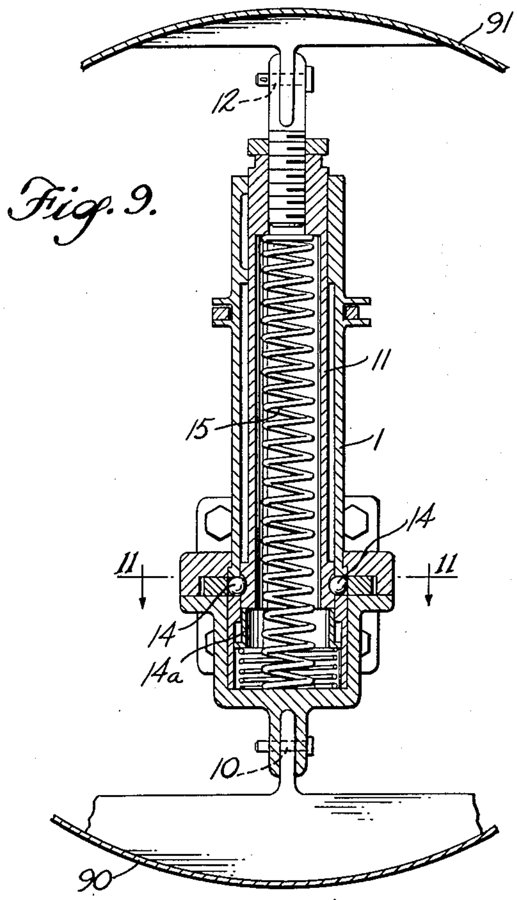
Figure 12:
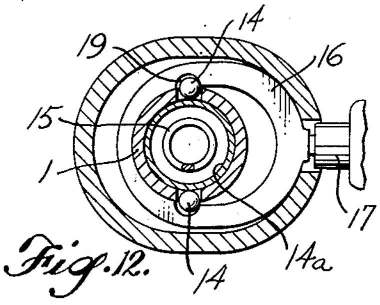

Figure 9 is a transverse sectional view, axially of the still-latched pilot-chute-opening mechanism. Figure 10 is a like view with that mechanism unlatched and released (corresponding with Figure 8), and Figures 11 and 12 are detail sections on lines 11—11 of Figure 9 and 12—12 of Figure 10, respectively, illustrating the latching and unlatching positions of the parts.

Figure 13:
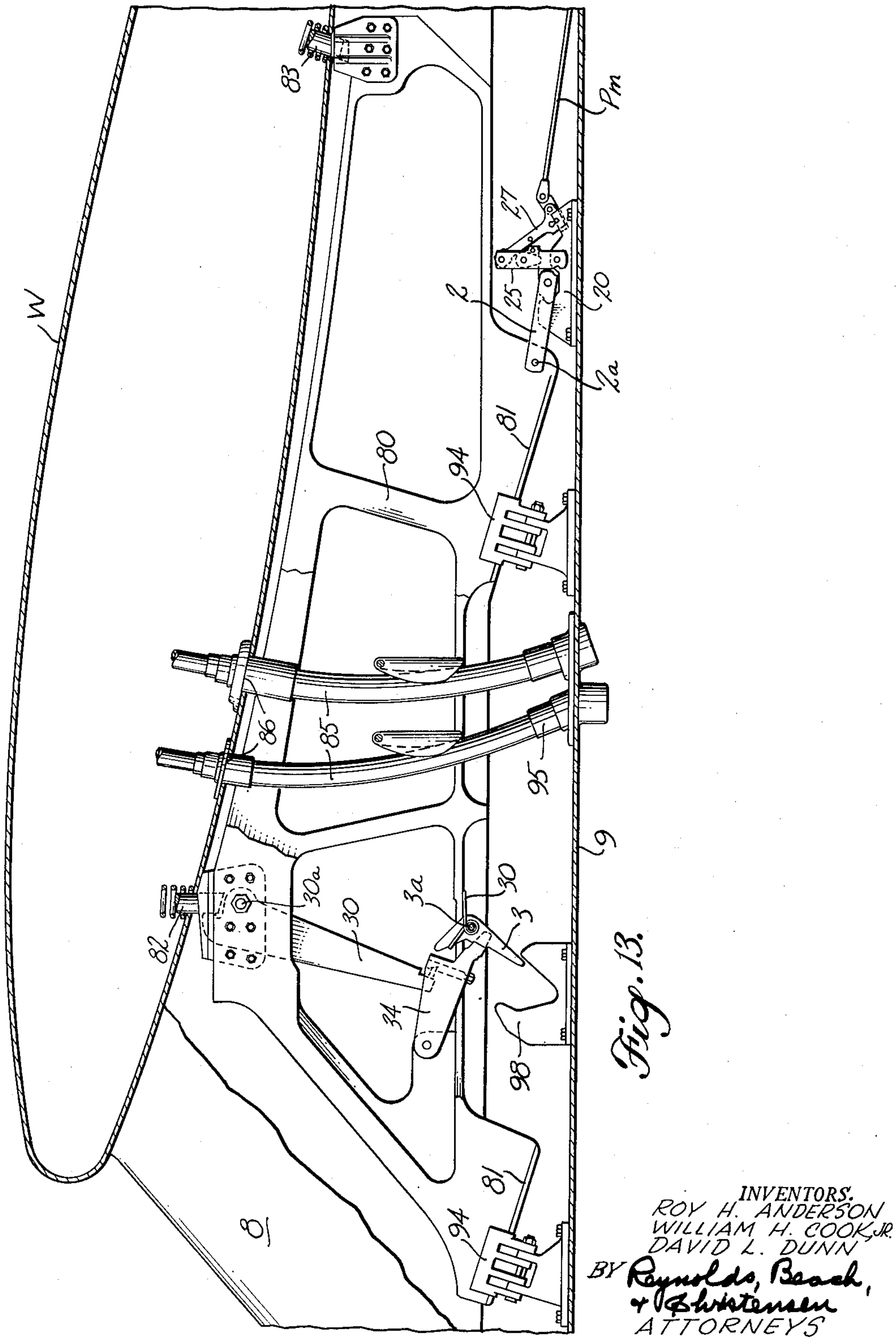

Figure 13 is a sectional view on a longitudinal vertical plane through the wing and the upper skin of the tank, looking laterally at the tank's main supporting strut, illustrating the mechanisms (all in secured position) by which the tank is supported from its main strut, and the latter is supported from the wing, for automatic release under the influence of the pull of the pullaway parachute canopy.

Figures 14, 15, 16, 17, 18:
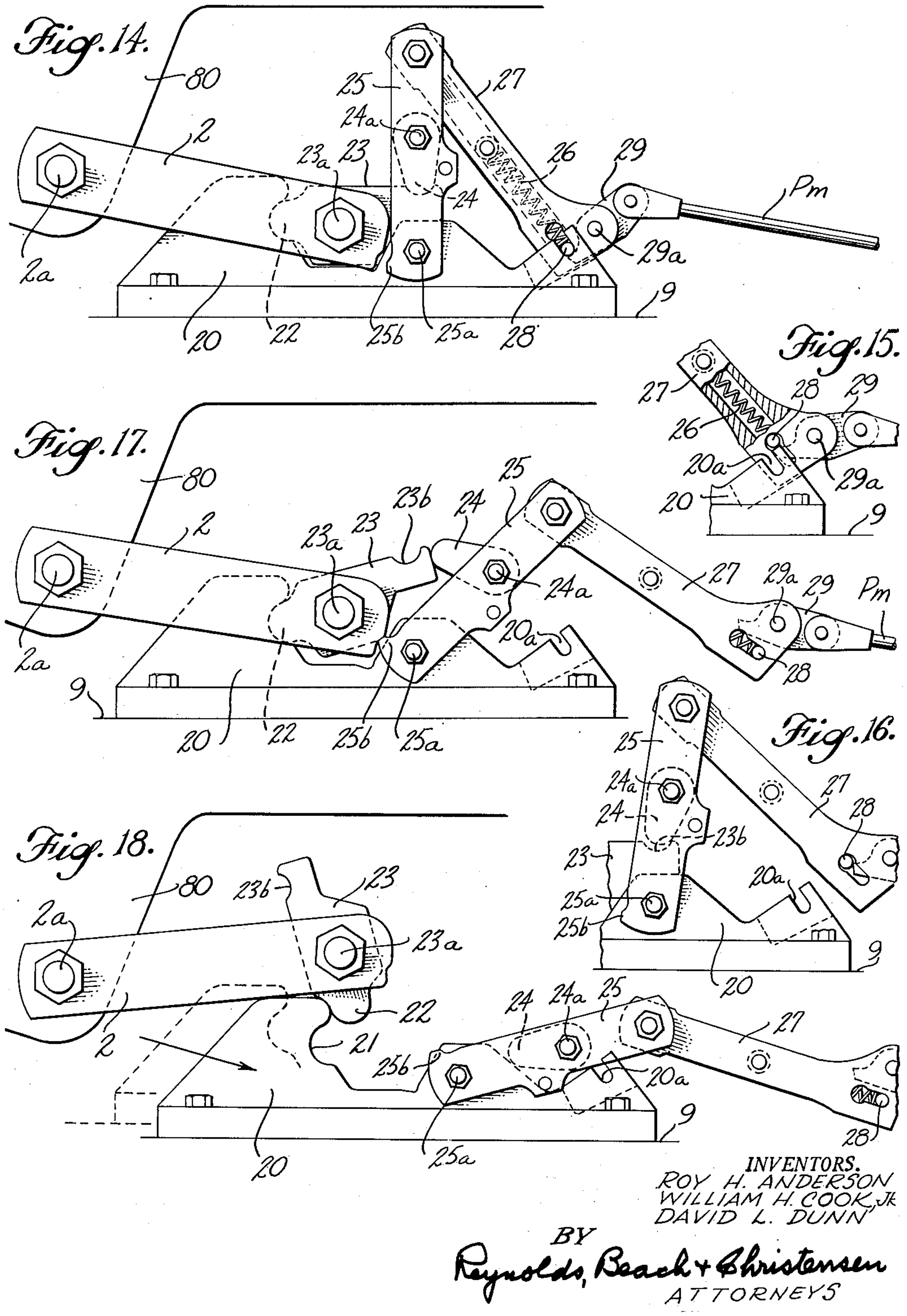

Figures 14 to 18 inclusive illustrate in side elevation, and somewhat enlarged over Figure 13, successive steps in the release of the tank from its main strut; Figures 14, 17 and 18 show this release mechanism complete, and Figures 15 and 16 are lesser details.

Figures 19, 20, 21:
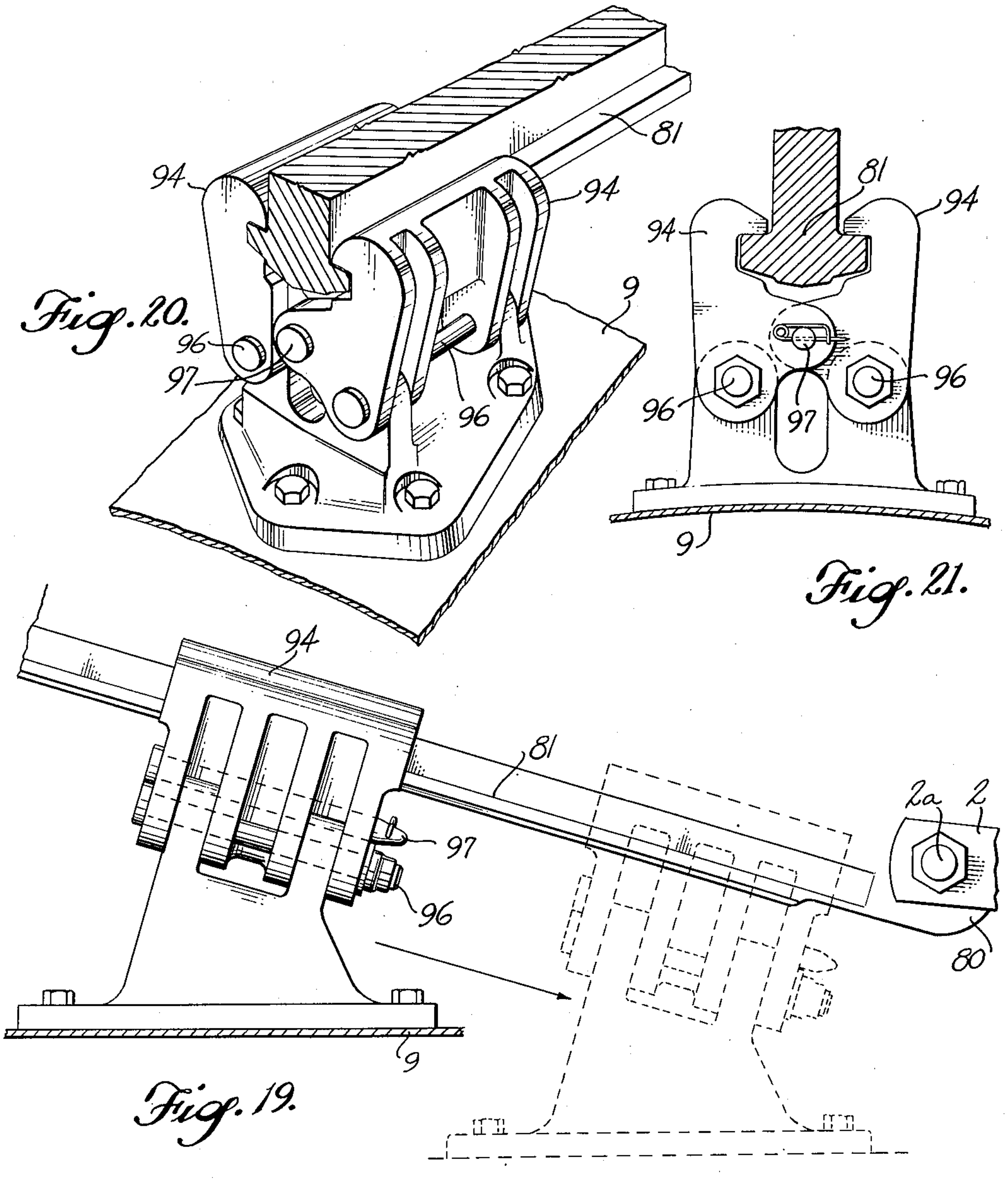

Figures 19, 20, and 21 are enlarged details of the means shown in Figure 13 whereby the tank is supported beneath the main strut until the release mechanism of Figures 14 to 18 has effected release. Figure 19 is a side elevational view, Figure 20 is a broken-away isometric view, and Figure 21 is a view transversely through the supporting track.

Figure 23:
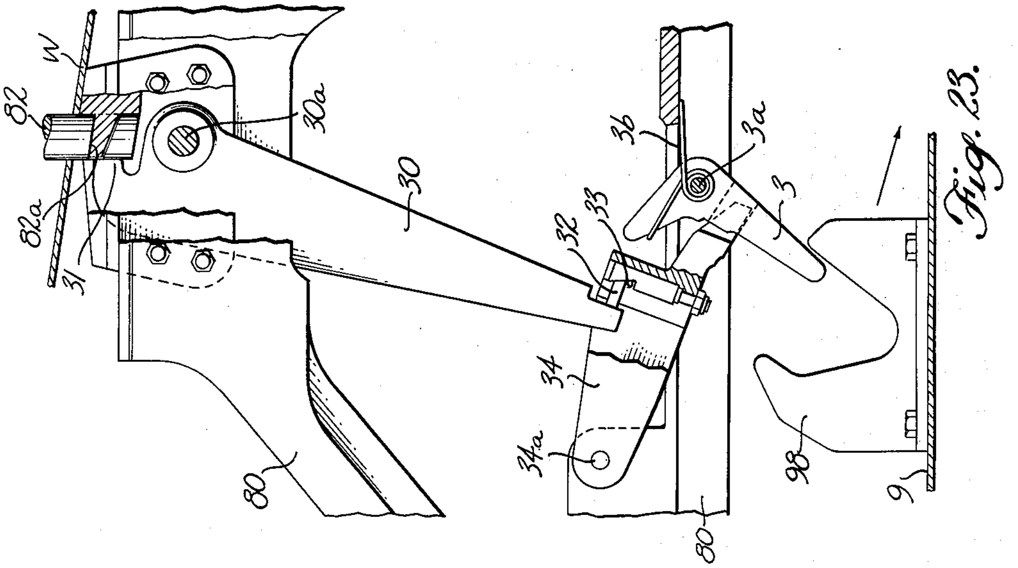
Figures 22, 24:
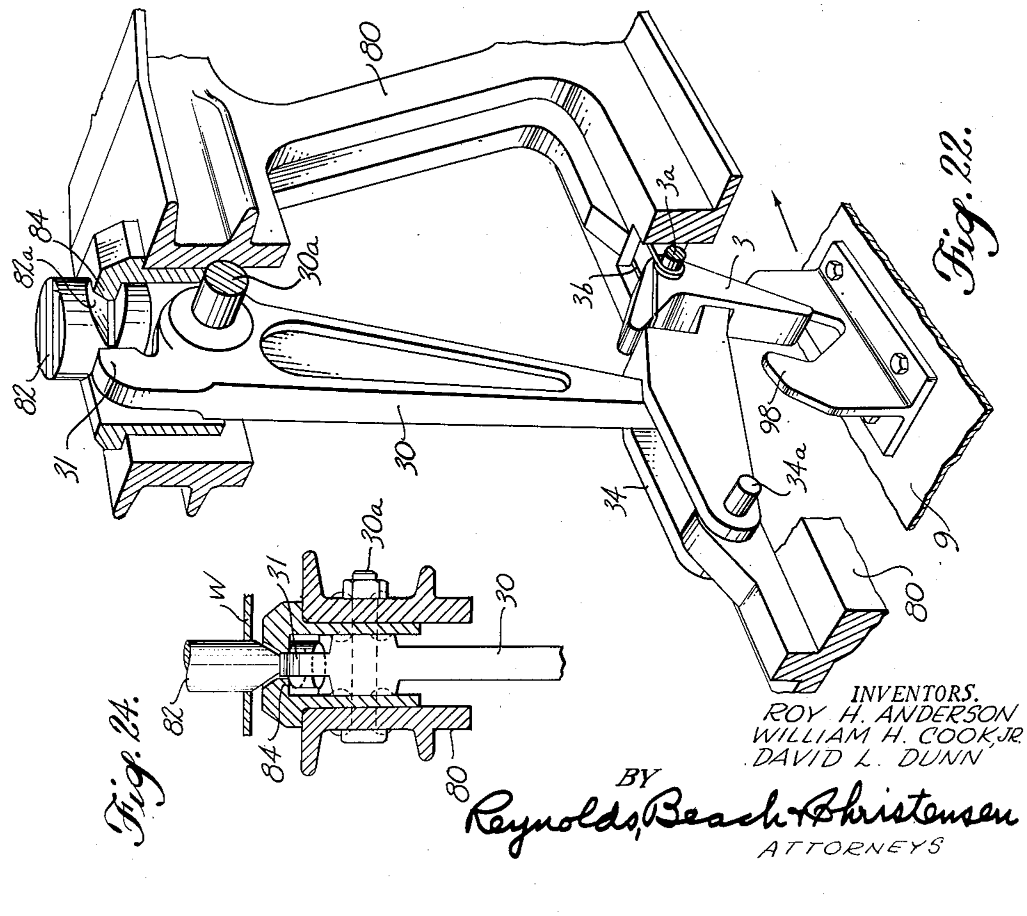
Figures 26, 27, 28:
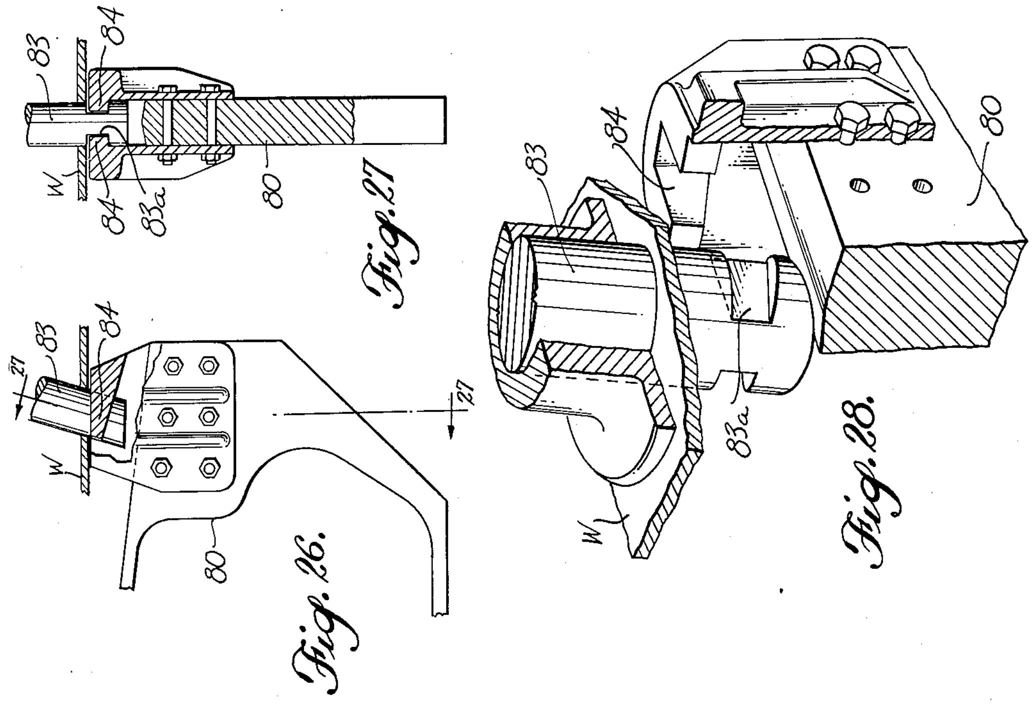
Figure 25:
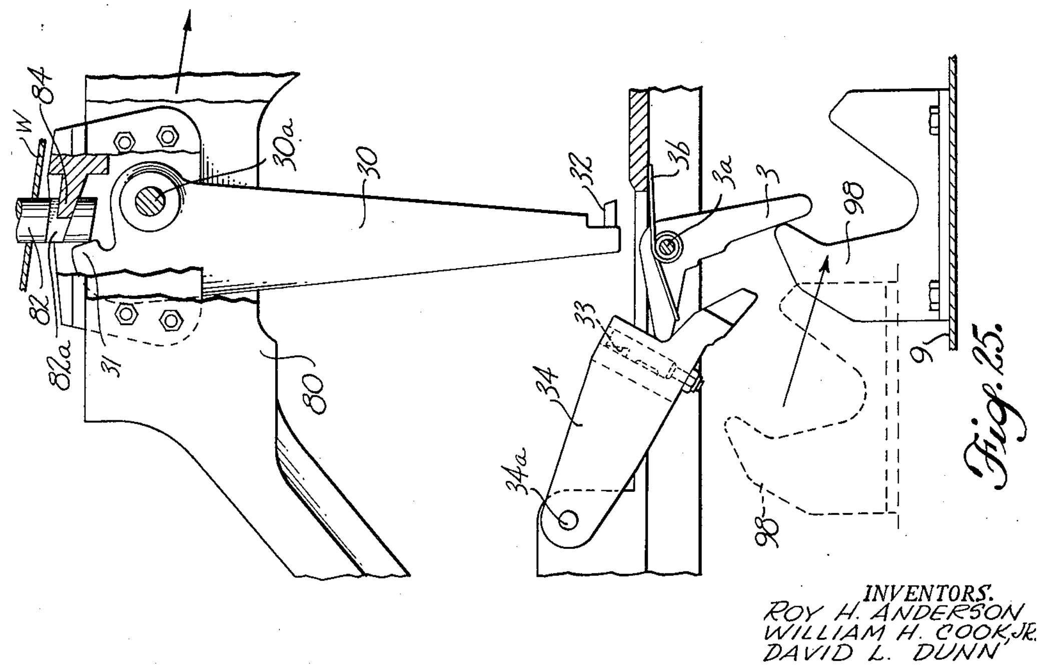

Figures 22 to 28 inclusive illustrate the support for the main strut at the underside of the wing, and the releasing mechanism therefor, all as shown in Figure 13; Figures 22 to 25 deal with the forward support and Figures 26 to 28 with the rear support. Figure 22 is a broken-away isometric view of the support and release mechanism in secured position, and Figure 23 is a corresponding side elevational view, with Figure 24 illustrating in cross-section the detail at the releasable point of support; Figure 25 is similar to Figure 23, but shows parts during the release and pulling away. Figure 26 is a side elevational view, partly broken away, of the rear main strut support, with parts in the secured position, Figure 27 is a section therethrough on the line 27—27 of Figure 26, and Figure 28 is an enlarged isometric view, broken away to illustrate the relationship of parts at the instant of release.

Figures 29, 30, 31:
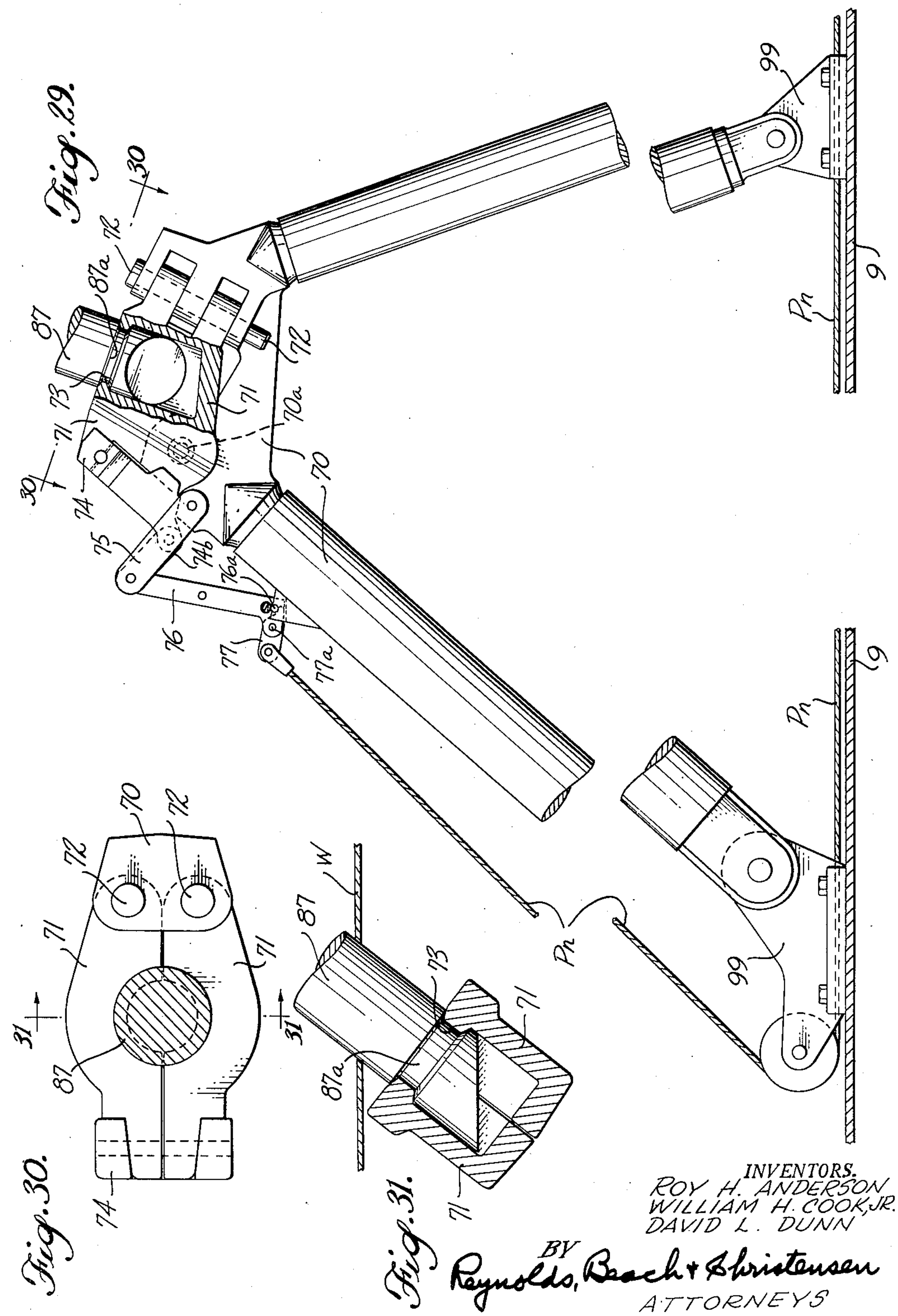
Figures 32, 33, 34, 35, 36:
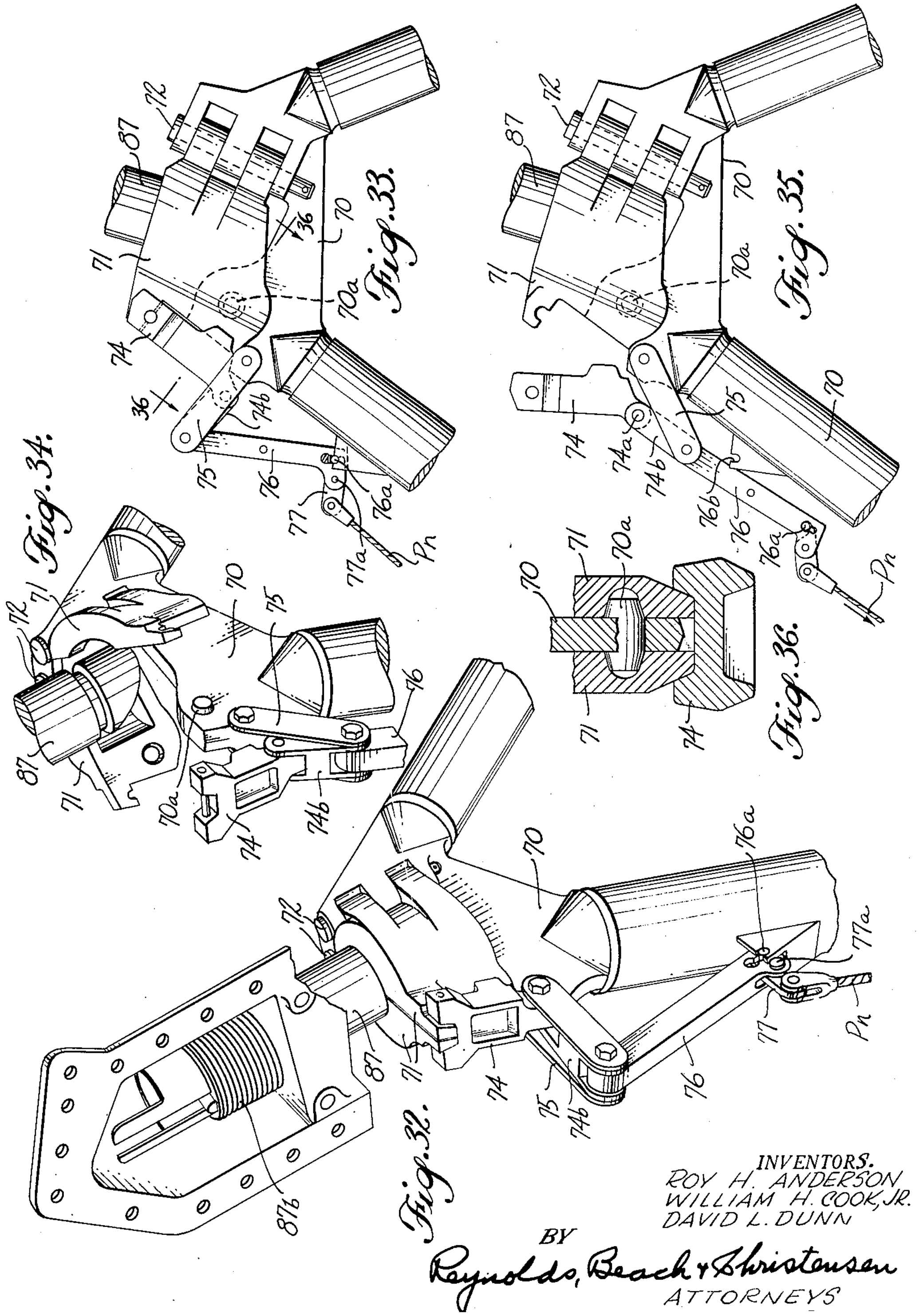

Figures 29 to 36 inclusive illustrate details of the securing and releasing mechanism for the tank's side strut, which also is operable under the influence of the pullaway parachute canopy; in all these views the streamlined fairing wherein the mechanism is housed is omitted. Figure 29 is a side elevational view, partly broken away, illustrating parts in their secured positions; Figure 30 is in the nature of a detail plan view, the viewpoint being indicated in Figure 29 by the line 30—30; and Figure 31 is a detail sectional view as indicated at 31—31 in Figure 30. Figure 32 is an isometric view, and Figure 33 a side elevational view, of the release mechanism for this side strut in secured position, and Figures 34 and 35 are respectively corresponding views with the mechanism in process of releasing, or actually released (Figure 34); Figure 36 is a detail section on the line 36—36 of Figure 33.

The wing W supporting the fuselage F of an airplane, which is propelled by multiple jet engines J, is intended to represent a typical high-speed, long range aircraft, and no one in particular, and such details as control surfaces, flaps, etc., which are immaterial to an understanding of the present invention, have been omitted. Any such airplane would have a relatively thin wing section for higher speed, and it is of the utmost importance that frontal drag area and unnecessary weight be reduced each to the minimum. It is proposed to support the jettisonable gas tank of the present invention, indicated in general at 9, at a location beneath the wing intermediate the inboard and outboard jet engines. In such a location it will impose no load upon the aircraft structure in excess of those for which it is designed. Such a tank would naturally be of the largest size consistent with the structural design and its ability to support the tank, and consistent with the other objectives indicated above. As can be seen by comparison in Figure 3, for example, between the length of the tank and the length of the wing chord, such a tank would be of rather large size and capacity, and of appreciable weight. It would be elongated fore and aft and of generally streamlined shape, terminating at the tail end in a cone, such as is indicated at 90. In order that wind forces which unavoidably act on the tank at the instant of its release will urge it downwardly away from the wing rather than upwardly towards the wing, it is preferred that the tank be supported beneath the wing in an attitude such that at an angle of attack of the wing consisent with a desired speed for long distance flight, the longitudinal center line of the tank will be inclined slightly downwardly at the nose. This is difficult to illustrate in the drawings, especially as the angle of attack will vary with the attitude, load, speed, etc., of the airplane, but the relationship of the direction of forward motion to the wing chord and to the longitudinal axis of the tank, respectively, is shown in Figure 3 by the angles $\alpha$ and $\beta$.

The tank 9 is supported from the wing by a long, narrow, main sctrut, generally indicated at 8, and rather than to make this the entire support of the tank, which would require that the strut be considerably wider and even longer than shown, and in order to distribute the attachment loads, it is preferred that a separate side strut 7 be employed, acting as a lateral sway brace between the tank and the wing. It has been found that two such struts rather than one single strut will reduce the frontal drag area and in addition will reduce the local wing attachment fitting loads, and hence is a preferable design, as shown.

By comparison of Figure 1, wherein the tank and its struts are shown firmly attached to each other and to the wing in condition for flight, with Figure 2 it will be seen that the tank 9 is separable from the main strut 8 and the main strut 8 is separable from the wing, and that the side strut 7 is fixed to the tank but is separable from the wing. It is not meant to imply that when the tank is dropped the main strut 8 becomes separated from the tank. The tank does move relative to the main strut 8 during dropping, but the two remain attached together and pull away together, as part of a single assembly, and thus the main strut 8 is not left free to constitute in itself a hazard in the process of dropping, but its separation is controlled by the same means that controls the separation of the tank.

The tail tip cone 90 of the tank is formed as a separate piece from the tank and is formed in part as a flap 91 which may swing upwardly into the air stream, as in Figure 3, under control of the pilot, in which condition it catches the air as a scoop and serves to pull off the entire tip cone 90, which then functions as a pilot chute to draw out from within the tail portion of the tank a parachute pack assembly P*a* (see Figure 5) which, upon pulling out and the detachment of the tip cone or pilot chute 90 and its deployment bag or canopy container P*d*, opens up as a parachute canopy P*c*, and this effects a pull on release and pull-off straps, to be described later in detail, that are attached to the tank and to release mechanisms, effects release of certain release mechanisms and they in turn effect release of certain other release mechanisms in the proper sequence, and finally the pull-away parachute canopy P*c* positively pulls the tank away from the airplane and controls its initial movement in such a way that it cannot strike nor damage the airplane; thereupon the tank falls free with only the resistance of the parachute canopy P*c* to break its fall.

As has already been stated, Figure 1 shows parts in the flight condition. Figures 3 and 4 illustrate the flap 91 just opened. Figure 5 shows the pilot chute open, and it has withdrawn the parachute pack assembly P*a*, and in Figure 6 the parachute canopy Pc has opened and has exerted the initial pull on release lines to effect movement of the tank 9 relative to the main strut 8, and release of the side strut 7 from the wing, and finally in Figure 2 the main strut 8 has been released from the wing, and the rearward pull of the parachute canopy Pc has pulled the tank and the struts connected to it rearwardly. The slight downward inclination at the nose of the tank serves to urge its nose downwardly rather than upwardly, although whereas Figure 2 shows the tank as having dropped below the wing, and yet at no appreciable distance behind the wing, as a matter of fact, at the instance of release the tank would be moved only slightly downwardly but primarily rearwardly under the influence of the pull of the parachute canopy, and the tank would be in nearly horizontal position and slightly, but not greatly, below the wing. The airplane would be far ahead of the tank before, in fact, the tank had assumed a downwardly slanted position corresponding to that of Figure 2, and in addition the tank and the parachute canopy would by then have dropped appreciably below the level of the wing rather than remaining at the unrealistic level shown in Figure 2. However, it was felt that it was not possible to illustrate these relative positions of the airplane and of the dropped tank within the confines of a drawing sheet, and so Figure 2 is an unreal and yet informative attempt to illustrate what happens after completion of release of the tank.

The pilot-actuated release-initiating mechanism is illustrated in Figures 7 to 12, inclusive. Within a compartment at the tail end of the tank 9, the parachute pack assembly Pa is supported in packed condition within a rearwardly opening recess 92, and is connected by a bridle cord Pb and bridle hook to the housing 1 of an extensible strut, the one end of which is pivotally mounted at 10 to the interior of the cone 90, and the other part 11 of which is pivotally connected at 12 to the flap 91. This flap is pivotally mounted adjacent its rear end, at the point 93, to the cone 90. When closed, the flap completes the streamline contour of the cone, but when the extensible strut 1, 11 is released and extended, the forward end of the flap is thrown upwardly into the airstream.

At its lower end, the member 11 is provided with opposite recesses in the form of an annular groove, indicated at 13, wherein latching balls 14 may be received when the element 11 is pressed downwardly in opposition to the spring 15 which urges it upwardly, and if the balls, being retained within the recess 13 by a reciprocable yoke 16, may not escape from the recess, the telescoping member 11 is locked by the balls in its contracted position. The yoke 16 is connected to the plunger 17 of a solenoid 18, and upon energization of the solenoid, the yoke 16 can be withdrawn from the latching position of Figures 9 and 11 into the unlatched position of Figures 10 and 12, in which latter position the latching balls 14 may withdraw outwardly into notches 19 in the yoke 16, and so will release the member 11, whereupon the spring 15 will throw the latter upwardly and open the flap 91. For purposes of manual actuation when the airplane is on the ground, a pull rod 18a may be actuated to the same end through a suitable access opening. As a safety measure, a collar 14a is spring-urged upwardly from a position beneath the balls 14, as in Figure 9, but is held downwardly by the lower end of the member 11, but when the latter moves upwardly the collar 14a may also move upwardly inside the balls 14, to retain the latter in their outwardly directed unlatched position, shown in Figures 10 and 12.

The parachute pack assembly Pa is connected through shroud lines Ps and a swivel connector S to tank pull-off straps, usually four in number, and designated Pp, and to two release straps or cables designated Pm (to identify that release which releases the tank from the main strut), and Pn (which designates the release for the side strut). All these lead forwardly from the receptacle 92, and from the parachute pack assembly Pa housed in the latter.

Proceeding next to the main strut and its connections respectively to the tank and to the wing, most of this is shown in Figure 13. The main strut 8 incorporates a forged or fabricated frame 80 which includes two longitudinally spaced rearwardly and downwardly inclined guide tracks 81, and slide elements 94 mounted at the upper side of the tank grip the tracks 81 closely. These constitute the actual support of the tank from the main strut, and rearward and downward movement of the tank's supporting and gripping elements 94 along their respective tracks 81 is prevented by a tension link 2 and associated parts under normal flight conditions. The frame 80 of the main strut in turn is supported from the wing through the medium of forward and aft supporting pins 82 and 83, the lower ends of which may be pulled below the wing but which, when released, will be drawn upwardly so that their lower ends lie flush with the wing's under skin. The actual engagement in each instance is accomplished by inwardly directed fingers 84 on the frame 80 received within complemental outwardly facing and rearwardly sloped shouldered notches 82a and 83a in the downwardly projecting portions of the respective mounting pins 82, 83 (see Figures 22 to 28, inclusive).

In addition to these mechanical connections, there are fuel hose line connections and electrical connections through the main strut 8. Two hose lengths 85 are illustrated extending from self-sealing slip joint connections at 95 to the tank, and similar slip joint fittings at 86 to the underside of the wing. These hose connections 85 are relatively short and so will pull out with only a slight displacement in the longitudinal direction between the fittings 95 and 86, respectively, which amount of movement is exceeded in the process of releasing by the initial rearward movement of the tank relative to the still-secured main strut 8. Electrical connections are similarly disconnectable, but for simplicity are not shown herein. They need consist of no more than a normal short pigtail with a jack connected to the tank and received within a socket at the underside of the wing. Moreover, there may be provision for sealing automatically or covering over to streamline any apertures left in the wing by the withdrawal of hoses and the like. Again, for simplicity, these elements are not shown.

For ease of mounting such a tank beneath the wing and to the main strut 8, the supporting and guiding members 94 may be formed as a pair of jaws separately pivoted each at 96, and capable of securement when pivoted inwardly to embrace the track 81 by a locking pin 97 (see Figures 20 and 21). It is never intended that the slides 94 should run off the lower end of the tracks 81 and completely disengage the latter. Rather stop means are provided to stop the rearward and downward movement of the tank along the tracks 81 while the slides 94 are still engaged with the tracks. Any suitable stop means to this end may be provided, but the end of the tension link 2, previously referred to, is so located as to engage the rear slide 94 and can constitute such a stop. The tension link 2 is never disengaged from the frame 80.

The mechanism by which the tank is locked to the main strut 8 and to its frame 80, and by which the tank is released from this main strut for relative but limited rearward movement, will now be explained. It is illustrated principally in Figures 14 to 18, as well as in Figure 13.

A bracket 20 securely attached to the upper side of the tank 9 is formed with a rearly facing rounded notch 21 within which the nose 22 of a short lever 23 is normally seated (see Figure 14). This lever 23 is pivotally connected at 23a to the tension link 2 already referred to, which is permanently pivotally mounted at 2a upon the frame 80 of the main strut. The lever 23 has also a rounded notch 23b, and under normal flight conditions a locking lever 24 pivoted at 24a upon a toggle lever 25, which in turn is pivoted at 25a to the bracket 20, normally seats and clamps the short lever 23 in a position where it will not permit the tension lever 2 to rise. The toggle lever 25 is normally urged forwardly, and the latch 24 into latched position, by means of a spring 26 reacting lengthwise of a link 27 and reacting from a latching pin 28 by the link 27, and seated in a notch 20a in the bracket 20. One nose of a short release lever 29 engages beneath the latching pin 28, whereby the latter may be lifted from its notch 20a whenever the release lever 29 is rotated about its pivot at 29a upon the link 27 by a pull upon the main strut release cable Pm.

Parts are shown in the normal flight condition in Figure 14, with the pin 28 received in its notch 20a and the spring 26 urging the toggle lever 25 forwardly at its upper end so to hold the locking lever 24 in its notch 23b and locking the short lever 23 against rotation, and thereby anchoring the tension link 2 against disengagement from the bracket 20. Whenever a pull is exerted upon the main strut release cable Pm (which is only after the parachute canopy Pc has opened), the ensuing rotation of the release lever 29 kicks the pin 28 upwardly out of its notch 20a into the position of Figure 15, whereupon continued rearward pull from Pm pulls the link 27 rearwardly, rotates the normal vertical toggle lever 25 and withdraws the locking lever 24 from engagement with the notch 23b of the short lever 23; see Figure 16. The pull on the tension link 2 is directed along a line somewhat above the effective bearing point of the nose 22 within its notch 21, with the result that the short lever 23 begins to swing upwardly at its rear end, as shown in Figure 17. This action is positively assisted by the nose 25b or the normally upright but now rotating toggle lever 25 engaging beneath the rear end of the tension link 2, as in Figure 17, to urge the latter upwardly. The force still originates in the pull of the parachute canopy. Thus urged, the tension link 2 disengages the short lever 23 from any further engagement with the bracket 20, Figure 18, and the bracket and the tank 9 on which it is mounted are free to move downwardly and rearwardly in a path controlled by the two tracks 81 and their slides 94, until such time as a stop or stops halt further rearward and downward movement of the slides and leave the tank in its extreme rear position with respect to the main strut 8 and its frame 80. This position of parts corresponds to the position illustrated in Figure 6.

It will be understood that the pull on the main strut release cable Pm which accomplishes the above described release cable Pm which accomplished the above described by the opening of the parachute canopy Pc and the consequent pull through the shroud lines and through the release cable Pm. At the same time the tank pull-off straps Pp were also drawn rearwardly under the pull of the parachute canopy Pc, and the tank is therefore being urged aft.

First, however, and simultaneously with release of the tank from the main strut, the coincident pull of the parachute canopy Pc on the side strut release cable Pn has accomplished release of the side strut from the wing. The mechanism whereby this is accomplished is shown in Figures 29 to 36, inclusive.

The frame 70 of the inclined side strut 7 is connected to the tank 9 at two longitudinally spaced points through the medium of brackets 99, but the connection to the wing need be at only a single point through the retractible mounting pin 87. The connection at this point is similar to the connection to the pins 82 and 83, although preferably slightly different in that the pin 87 is provided with a completely encircling groove 87a, whereupon two jaws 71 book-hinged together at 72 to an element of the frame 70 may, when swung closed, embrace the lower end of the pin 87 and inwardly directed flanges 73 will then fit into the groove 87a. So long as the jaws 71 are held closed, no disconnection can take place, but if they are permitted to open, disconnection is readily effected.

The swingable but closed ends of the jaws 71 are embraced and held closed upon a stress-transmitting pin 70a by the notched end of a retainer 74 pivotally mounted at 74a to a link 74b, which in turn is pivotally mounted upon the end of a toggle link 75. Normally this toggle link is in a somewhat off-center position, as shown in Figure 33, but when the link 74b is pulled downwardly and the toggle link 75 is likewise pulled past its dead center position, the retainer 74 will disengage the jaws 71 and permit them to fly open. Such downward movement of the link 74b is normally prevented by a latching link 76 which, like the link 27, is provided with a latching pin 76a received in a notch 76b formed in the frame 70 and spring-urged thereinto, this pin 76a being releasable to rotation of a release lever 77 pivoted upon the end of the link 76 at 77a, and rotated by a pull upon the side strut release cable Pn. Figures 32 and 33 show parts in the secured position for normal flight, and Figures 34 and 35 show the effect of the pull upon the release cable Pn, which acts to kick the latching pin 76a out of its notch, then to pull upon the link 76 and its companion 74b, and so to pull the retainer 74 away from engagement with the open and swinging ends of the jaws 71. These jaws promptly fly open, disengaging the side strut from the supporting pin 87, and so from the wing. The pin 87, under the influence of its spring 87b, withdraws until its slanted end is flush with the underside of the wing. The side strut 7 being thus disengaged simultaneously with disengagement of the tank from the main strut 8, will not in any way impede the limited rearward and downward movement of the tank relative to the main strut, which has already been described. This leaves the tank supported only by its connection to the main strut, and by the main strut's not-yet-released attachment to the wing. At the same time the tank, as has already been pointed out, is being urged steadily rearwardly by the pull of the parachute canopy Pc.

There remains only to describe the automatic and immediately following disconnection of the main strut 8 from the wing, which is initiated by the rearward and downward movement of the tank relative to the main strut, and the mechanism for which is illustrated in Figure 13 and primarily, also, in Figures 22 to 25, inclusive.

As will be seen in Figure 13 and also in Figures 22 and 23, a bracket 98 carried by the tank is located in a position where, by downward and rearward movement of the tank during the initial stage of the releasing operation, it will strike and rotate a crank 3 which is pivoted at 3a upon the frame 80 and will rotate this crank (see Figure 25) in opposition to a spring 3b which biases it to remain in the latched position shown in Figures 13 and 23. The effect of so doing will appear shortly.

It will be remembered that the mounting of the main strut beneath the wing was described above as being accomplished by the engagement of inwardly directed fingers or flanges 84 carried by the frame 80 within notches 82a of the forward supporting pin 82 and 83a of the aft supporting pin 83. It was not earlier explained, however, how these parts were retained in this interengagement, especially as the interengaging surfaces are rearwardly and downwardly sloped. No retaining means is necessary at the rear pin 83 and none is provided, so long as a retaining means is provided in conjunction with the forward supporting pin 82. This retaining means consists of a nose 31 directed rearwardly at the short upper end of a clamp lever 30 pivoted at 30a upon the frame 80. So long as this nose 31 engages the pin 82, the frame 80 cannot move rearwardly to disengage its flanges 84 from the pin 82, nor, consequently, can the frame disengage the rear pin 83. The clamp lever 30 and its nose 31 are held in this latched position by means of engagement of a latch element 32 carried at the lower end of the lever 30 with a complemental latching element 33 upon a prop 34 pivoted at 34*a* upon the frame 80. The interengagement between the elements 32 and 33 is such, by means of an incline or otherwise, as to urge them toward latch-engaged position rather than away from the same. However, they can be moved away from their interengaged position by downward movement of the rear end of the prop 34, and that can be accomplished by rotation of the crank 3 in opposition to its spring 3*b*.

It will be remembered that the rearward movement of the tank and of the bracket 98, which accompanies the sliding movement of the tank rearwardly and downwardly upon first release, will cause rotation of the crank 3 as the tank reaches its downward and rearward limit of movement. In consequence, rotation of the crank 3 from the position in which it is shown in Figures 22 and 23, to the position in which it is shown in Figure 25, will swing the prop 34 downwardly, releasing the interengaging latch elements 32 and 33, and leaving the clamp lever 30 now unsupported and unable to resist the forces of air pressure against the main strut itself and of the pull of the parachute canopy P*c* on the rear end of the tank. In consequence, the main strut, still connected to the tank, will be drawn rearwardly to withdraw the supporting ledges or fingers 84 from the slots 82*a*, and to withdraw the similar ledges or fingers 84 from the slot 83*a* in the rear pin 83 simultaneously, and thus the last connection between the tank and the wing, specifically that between the upper end of the main strut 8 and the pins at 82, 83, is broken, and immediately the tank is pulled rearwardly, or rather its forward motion is checked abruptly by the pull of the parachute canopy P*c*, permitting the airplane to drive ahead, but by the rearward pull of the canopy and the continuing forward momentum of the tank controlling the movement of the tank and struts so that they cannot tumble or strike any part of the aircraft.

In review, then, the pilot initiates jettisoning of the tank by energizing the solenoid 18 to effect opening of the flap 91 and pull-away of the pilot chute 90, 91, and this in turn, acting through the bridle cord P*b*, pulls away the parachute pack assembly P*a* and the latter opens, the pilot chute dropping away. The pull effected by the parachute canopy P*c*, acting through the release cables P*m* and P*n*, accomplishes first the release of the tank from the main strut 8 and limited rearward and downward movement of the tank, and simultaneously the release of the side strut from the wing. Rearward and downward movement of the tank first pulls out the fuel lines 85, and similar electrical connections, permitting closure of their remaining fittings or connections, and then terminates with engagement between the bracket 98 and the crank 3. This in turn effects release of the main strut from the wing, whereupon the continued pull of the parachute canopy P*c*, acting through the pull-off straps P*p*, pulls the still forwardly traveling tank rearwardly relatively to the airplane, under full control until the airplane has passed so far ahead of the tank that there can be no danger, whereupon the tank and its struts sag downwardly as shown in Figure 2, and drop free.

We claim as our invention:

1. For use upon an airplane having attachment fittings projectable beneath its wing: a drop tank assembly including a tank proper of generally elongated streamlined shape, a tank-supporting main strut located intermediate the tank and the underside of the wing, releasable attachment elements carried by the strut for engagement with certain of the wing's attachment fittings to support and secure the strut fixedly beneath the wing, and including an actuating element which is disposed in a given position while the releasable attachment elements are in strut-secured position, and movable, when actuated, to release said strut-carried attachment elements and so to disengage the strut from the wing, guide means interengageable between the tank and the main strut to support the tank from and for movement relative to the strut, further releasable attachment elements carried by the tank and by the strut and interengageable to maintain the tank fixedly with relation to the strut, but permitting limited, non-detachable movement of the tank rearwardly relative to the strut upon release of said further attachment elements, means carried by the tank and operatively arranged relative to and engageable with said actuating element, to move the latter from its given position to a releasing position and thereby to effect release of the attachment elements between the strut and the wing, as the tank completes its rearward guided movement relative to the strut, a parachute pack assembly, including an openable parachute canopy, connected to the after end of the tank and normally completing its streamlined shape, a release cable extending from said parachute pack assembly to said further releasable attachment elements between the tank and the strut, to initiate release thereof upon opening of and rearward pull by the parachute canopy, and pilot-actuatable means to effect release of said parachute pack assembly from its normal connection to the tank, for opening thereof and rearward movement of the tank relative to the strut, and consequent movement of the actuating element of its releasing position, and consequent detachment of the drop tank assembly from the wing attachment fittings.

2. The combination of claim 1, including additionally a side strut connected to the tank and for connection to an attachment fitting carried by and projectable beneath the wing, other than those which support the main strut, still further releasable attachment elements carried by the side strut for operative engagement with such other attachment fitting, and a second release cable extending from the parachute pack assembly to such still further attachment elements, to release the latter substantially coincidentally with release of the attachment elements between the main srut and the tank.

3. The combination of claim 2, wherein the third or still further releasable attachment elements comprises two forwardly opening jaws pivotally mounted at the upper end of the side strut and formed with inwardly directed flanges and adapted for mounting in a grooved wing-mounted attachment fitting in the grooves whereof said jaws are supportingly received, constituting the other attachment fitting, a retainer operatively engaged with the swinging forward ends of said jaws to secure them in closed position, and latching means to maintain said retainer in jaw-secured position; and wherein the second release cable is operatively connected to said latching means, to unlatch the same and thereby to disengage said retainer for opening of the jaws, under the influence of the pull of the opened parachute canopy.

4. The combination of claim 1, wherein the guide means which interconnect the tank proper and the strut includes a longitudinally directed track on one of the tank proper or the strut and slide means on the other of those two elements, embracing said track means, and wherein the further attachment elements interengageable between the tank and the strut include a rearwardly directed tension link pivoted upon the strut and a short lever pivoted upon said link, and a rearwardly recessed bracket mounted upon the tank in position to receive one end of the short lever within its recess, and so to secure the tank in its forward position, and securing means on the tank engageable with said short lever to retain it in such position, the release cable from the parachute pack assembly to said further attachment elements being operatively connected to said securing means, to release the latter, and so to disengage the short lever and tension link from said bracket, under the influence of the opened canopy's pull.

5. The combination of claim 4, wherein the securing means includes a release lever having one end positioned, when parts are in securing position, beneath the forward end of the tension link, and rotatable by releasing movement of the release cable to pry upwardly such forward end of the tension link, for positive release of the latter from the bracket.

6. The combination of claim 1, wherein the releasable attachment elements on the strut for engagement with certain of the wing attachment fittings include laterally inwardly directed fingers on the strut, adapted for engagement with complemental shoulders upon the wing-mounted attachment fittings, for supporting engagement with such shoulders, and for disengagement by rearward movement of the strut, a clamp lever on the strut having an upper nose positioned for operative engagement with the forward surface of such a wing attachment fitting to prevent rearward movement of the strut, and having a long lower end; securing means to retain said clamp lever in such position, including a crank pivotally mounted on the strut with one end depending and its other end normally operatively connected with the lower end of the clamp lever, to retain the latter in engagement with its wing attachment fitting; said clamp lever and its securing means collectively constituting the further releasable attachment elements to maintain the tank fixedly beneath the strut; and a bracket mounted on the tank proper, in position to engage said crank's depending end as the tank approaches the rear limit of its movement following opening of the parachute canopy and release of the further attachment elements between the tank and the strut, and so to swing said crank from its position of operaive connection to the clamp lever, to release the latter and to permit swinging of said clamp lever into an inoperative position relative to its normally engaged wing attachment fitting.

7. The combination of claim 1, wherein the tank is recessed at its rear end, for reception of the parachute pack assembly, and the pilot-actuated parachute pack release-effecting means comprises a cone assembly normally constituting the after tip of the tank and embracing its end to close its recess, said cone assembly including a forwardly and outwardly opening flap element, and the cone proper and flap element together constituting a pilot chute, extensible and contractible means interconnecting the cone proper and said flap element, means to lock the same normally in contracted position, means to bias the same to its extended position, an actuator energizable under control to unlock said interconnecting means for outward projection of the flap, and a parachute-expelling connection between said parachute pack assembly and said pilot chute, to expel the parachute pack assembly from its recess after detachment of the pilot chute by the air forces acting on the projected flap element, and to initiate opening of the parachute canopy.

8. The combination of claim 1, including additionally conduit means extending from the tank and for connection to the wing, and including slip joint connections arranged for disconnection during the limited rearward movement of the tank relative to the strut.

9. In an airplane drop tank assembly, wherein the tank is formed with a streamlined exterior having a rearwardly opening recess at its after tip, in combination with such a tank, releasable means for the support of said tank from complemental attachment fittings carried by and beneath an airplane wing, a parachute pack assembly housed within the tank's recess, tensional tank-pull-off means extending between said parachute pack assembly and the tank, further tensional means extending between the parachute pack assembly and said releasable means, a cone assembly shaped to embrace and complete the after tip of the tank and to enclose its recess, and including a cone proper and a forwardly and outwardly opening flap mounted upon said cone, said flap being biased towards an open position, means to retain said flap normally in its closed position, means interengageable between the cone assembly and the tank, when the flap is in closed position, to retain the cone assembly in place upon the tank, pilot-actuated means to release said retaining means, to enable the flap to open and the cone assembly to be released from the tank, and tension means extending from said cone assembly to the parachute pack assembly, to withdraw the latter from the recess, for opening, upon and by release of the cone assembly.

10. The combination of claim 9, wherein the flap is pivotally mounted at its rear end upon the cone, and the means to retain the flap in its closed position comprises two telescopingly connected strut elements transversely disposed within the cone, and biased for extension, one being mounted upon one cone part and the other to the pivotally mounted flap; detent means interengageable between said strut elements to retain them in contracted relationship, and the pilot-actuated means to release said retaining means is operatively connected to said detent means to withdraw the latter from retaining position.

11. In an aircraft drop tank assembly, in combination with the tank proper, a main strut for securement beneath an aircraft wing, guide means on the tank and complemental guide means on the strut, supporting and guiding said tank beneath and from the strut for rearward movement from a forward flight position to a rear dropping position, and interconnecting the strut and tank in all relative positions, complemental stop means on the tank and on the strut positioned for interengagement to limit the tank's rearward movement, a first releasable locking means for securing said tank relative to the strut in its forward flight position, a second releasable locking means for securing the strut in flight position to attachment fittings which are mounted upon the aircraft wing, pilot-actuated means to release said first locking means, and releasing means for said second locking means including an element on the strut and a complemental element on the tank, relatively positioned for engagement during rearward movement of the tank along its guide means and relative to the strut, prior to stopping in its rearward dropping position, one such element being operatively connected to the second locking means.

12. The combination of claim 11, including a hose conduit releasably interconnecting the tank with a wing attachment fitting, and of such length and so arranged relative to the rearward travel of the tank, to be released by such travel prior to engagement and release of the second locking means' elements.

13. The combination of claim 11, including a side strut projecting upwardly from the tank for securement at its upper end to an attachment fitting which is mounted upon the aircraft wing, a third releasable locking means carried by said side strut to secure the same in flight position to such wing attachment fitting, and releasing means for said third locking means operatively connected to said pilot-actuated means for release simultaneously with release of said first locking means.

References Cited in the file of this patent

UNITED STATES PATENTS

| | | |
|---|---|---|
| 1,782,134 | Coplen | Nov. 18, 1930 |
| 1,916,340 | Softis | July 4, 1933 |
| 1,989,450 | Holloway | Jan. 29, 1935 |
| 2,138,970 | Jones | Dec. 6, 1938 |
| 2,164,531 | Lee | July 4, 1939 |
| 2,381,402 | Weber et al. | Aug. 7, 1945 |
| 2,417,342 | Bach | Mar. 11, 1947 |
| 2,421,699 | Johnson | June 3, 1947 |
| 2,421,870 | Dornier et al. | June 10, 1947 |
| 2,501,559 | Winzen et al. | Mar. 21, 1950 |
| 2,513,867 | Hefferman | July 4, 1950 |
| 2,549,785 | Douglass | Apr. 24, 1951 |
| 2,550,380 | Redford | Apr. 24, 1951 |
| 2,665,093 | Manfredi et al. | Jan. 5, 1954 |

FOREIGN PATENTS

| | | |
|---|---|---|
| 580,615 | Germany | July 13, 1933 |